United States Patent [19]

Cowan

[11] Patent Number: 5,119,799
[45] Date of Patent: Jun. 9, 1992

[54] LIGHTWEIGHT COLLAPSIBLE WOODBURNING STOVE

[76] Inventor: Michael F. Cowan, 5196 Sonora Drive, North Vancouver, B.C., Canada, V7R 3V6

[21] Appl. No.: 684,857
[22] Filed: Apr. 15, 1991
[51] Int. Cl.$^5$ ............................................. F24C 1/16
[52] U.S. Cl. ................................. 126/9 R; 126/59; 126/65
[58] Field of Search .................... 126/9 R, 65, 58, 59

[56] References Cited

U.S. PATENT DOCUMENTS

| | | | |
|---|---|---|---|
| 889,254 | 6/1908 | McMorrow | 126/59 |
| 1,411,596 | 4/1922 | Tallman | 126/9 R |
| 1,750,853 | 3/1930 | Morley | 126/9 R |

FOREIGN PATENT DOCUMENTS 489015  12/1952  Canada ................................. 126/59

Primary Examiner—Carroll B. Dority

[57] ABSTRACT

This invention is a small, very lightweight, fuel efficient, collapsible woodburning stove comprising six parts that form a combustion chamber, and four supporting legs, all fabricated from thin sheet metal by cutting or die-stamping, and all held together as a fully functional unit solely and entirely by a system of flanges produced by bending peripheral edges of the six parts and four supporting legs, and by four easily installed and removed pin-spring-chain assemblies.

2 Claims, 3 Drawing Sheets

LIGHTWEIGHT COLLAPSIBLE WOODBURNING STOVE

This invention is a small, very lightweight, fuel efficient, collapsible woodburning stove which is easily and quickly assembled or dismantled without the use of any tools, and can be readily carried in a backpack. It is specifically designed for cooking and for heating the space inside portable lightweight fabric tents used for recreational camping and wilderness shelters. The heat output of the stove is sufficient to maintain the space inside such tents at temperatures consistent with comfort, even when outside temperatures are sub-zero.

There are, and have been, numerous woodburning camp stoves manufactured for use in space heating and cooking within large, heavy fabric tents used by hunters, trappers, prospectors, geologists, and others, for temporary wilderness shelters. Several sizes of large volume, non-collapsible and collapsible woodburning tent heaters and cookstoves are presently manufactured, and used where transportation of supplies is by horses, motorized all-terrain vehicles, snow machines, power boats, or small aircraft. The large size and heavy weight of such stoves preclude their use in tents used in recreational backpacking and other recreational wilderness activities such as canoeing and kayaking.

The only stoves manufactured and marketed for use in recreational backpacking and other recreational wilderness travel are small, lightweight gas-fueled types that have serious disadvantages. All fuel for them must be carried, presenting a weight problem for any expeditions lasting longer than several days. Their use as space heaters is very restricted by the necessity of conserving the carried fuel for cooking, and by their small heat output capacity. While they can be used as space heaters in small tents when outside temperatures are relatively mild, they are virtually useless as space heaters when outside temperatures are low or sub-zero. Most significantly, their use as space heaters in small tents is extremely dangerous due to their toxic combustion emissions that are invisible, odourless, and potentially lethal if adequate ventilation of the tents is not maintained.

The stove invented and described herein is designed to compete with, and surpass in performance, any gas-fueled lightweight cooking stove. Unlike the gas-fueled stoves discussed above, this invention provides not only excellent cooking capabilities, but also very effective heating for lightweight camping tents, supplying the occupants with warmth and the capability of rapidly drying wet clothing and footwear in adverse weather conditions of any season, and especially the more severe conditions of winter. Most significantly, the stove is not dependent on carried fuel, since sufficient fuel can always be found virtually anywhere in wilderness areas, with the exception of those areas covered by permanent ice or snowfields that prevent growth of vegetation.

Use of the stove has negligible impact on the local environment. The stove consumes very little fuel and that fuel is in the form of dead tree branches and twigs from the ground, dead branches found near the bases of living trees, small dead saplings cut to size, and small pieces of driftwood. It is absolutely unnecessary to destroy living trees or shrubs to provide fuel for the stove. Fuel consumption is approximately two kilograms of dry wood per hour with air intake and damper fully open, and two kilograms per eight hours with air intake and damper fully closed, when the combustion chamber is 18 centimeters wide, 18 centimeters high, and 30 centimeters long. With a combustion chamber of this size, the stove is capable of heating a tent 2.1 meters wide by 2.7 meters long by 2.0 meters high with walls 0.9 meters high from $-12°$ C. (outside temperature) to $+20°$ C. in fifteen minutes. The stove is also capable of bringing one half liter of cold water to the boiling point in two and a half minutes. The stove contains no screws or bolts and its assembly or dismantling can be accomplished easily and rapidly without resort to any tools whatsoever. It can be assembled in less than two minutes and dismantled in thirty seconds. The stove itself weighs only one and a half kilograms. Total weight of the stove plus all stovepipes, damper, heat shields, and accessories required to safely vent combustion products through a tent wall is three kilograms which is approximately equivalent to the weight of a gas-fueled stove plus a week's supply of fuel to operate it for cooking purposes only.

The stove will be a valuable item of equipment for recreational wilderness backpacking, wilderness winter camping, wilderness canoeing, wilderness kayaking, river rafting expeditions, scouting activities, outdoor education, recreational campground camping, prospecting and mineral exploration, charter aircraft survival kits, and wilderness search and rescue operations.

In drawings which illustrate embodiments of the invention:

Figure 1:
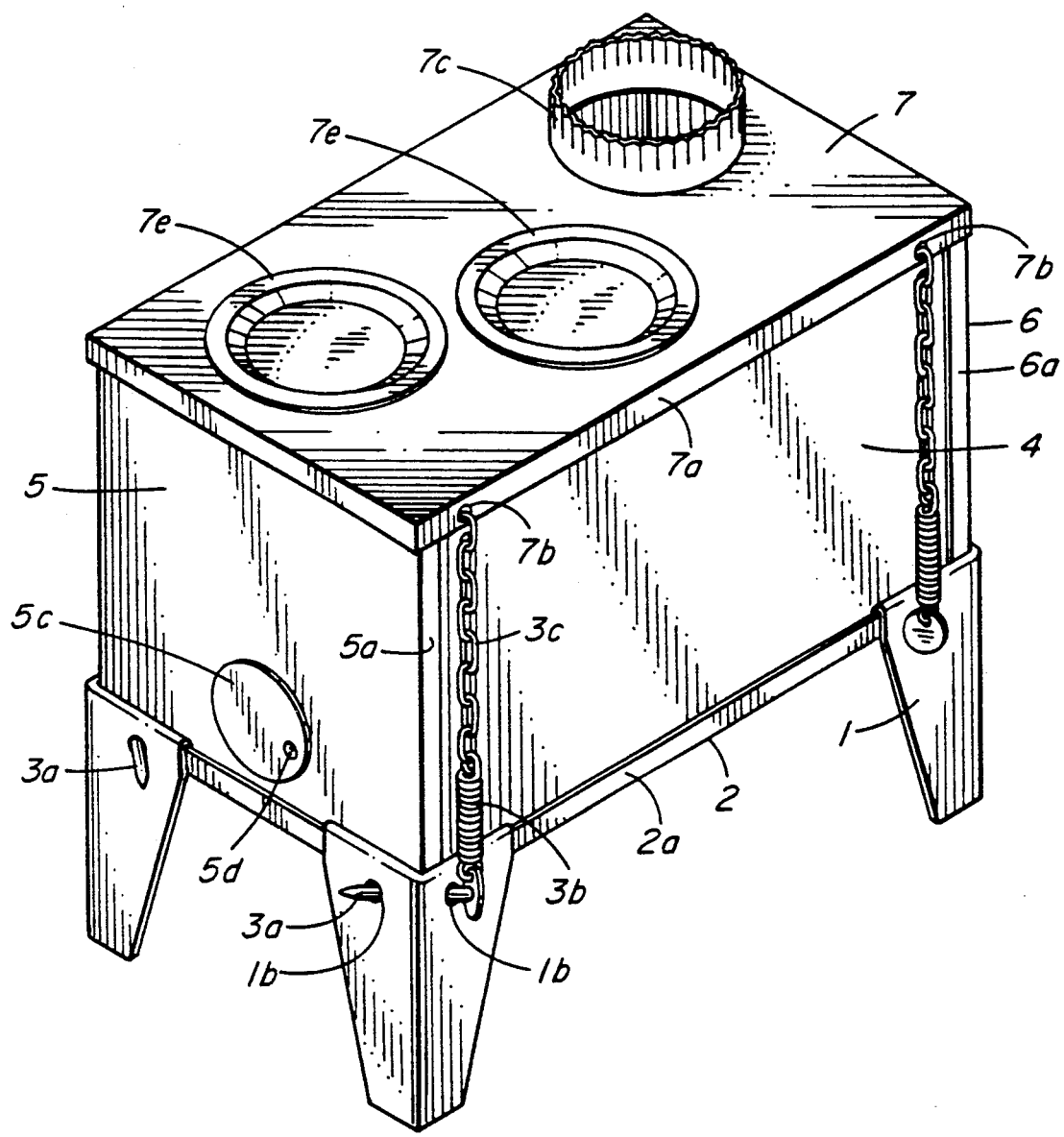
FIG. 1 is an isometric perspective view of the assembled stove.
Figure 2:
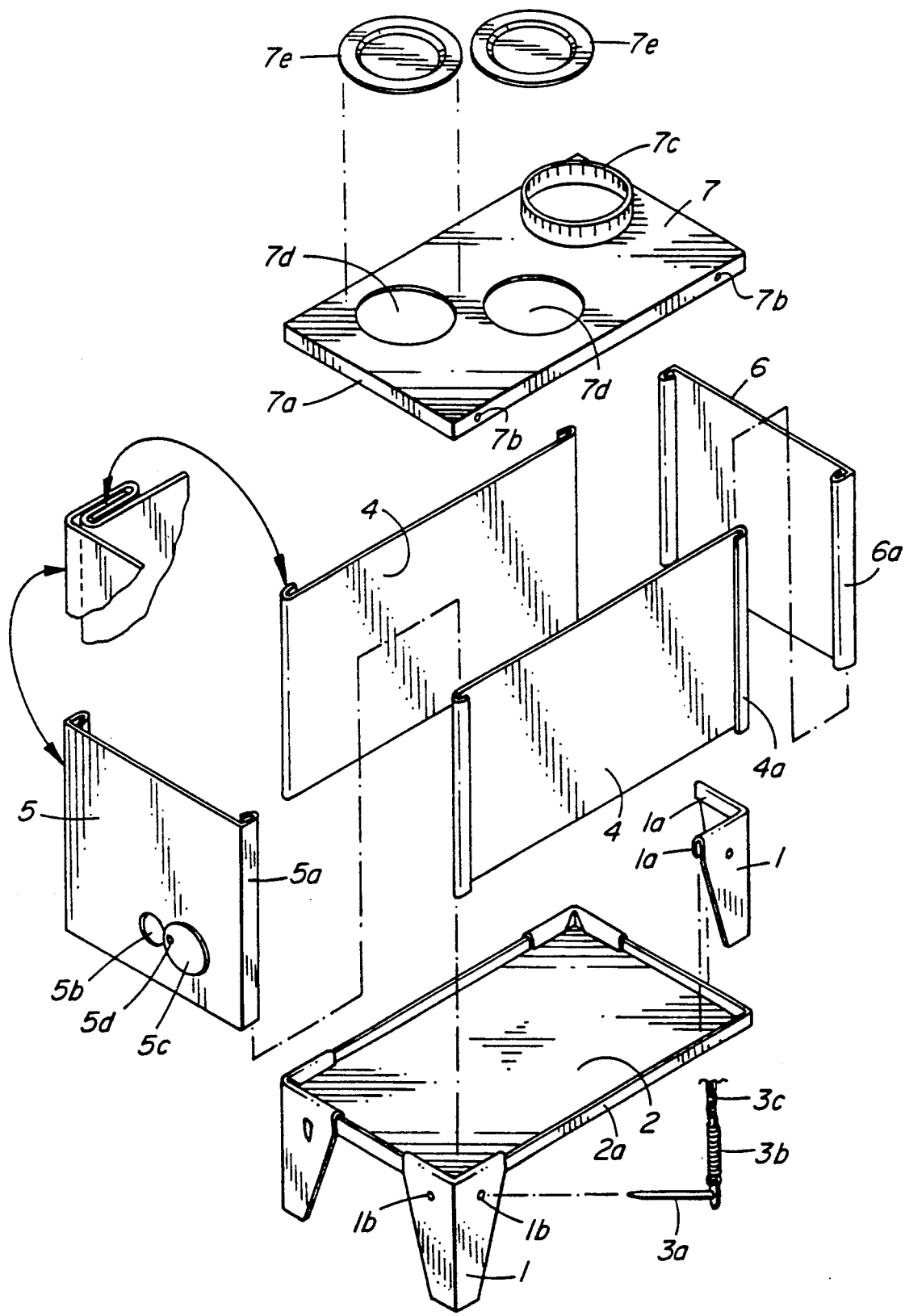
FIG. 2 is a partially exploded isometric perspective view of the stove showing the essential components and system of peripheral edge flanges, with an enlargement showing in detail a portion of the vertically positioned edge flanges interlocked.
Figure 3:
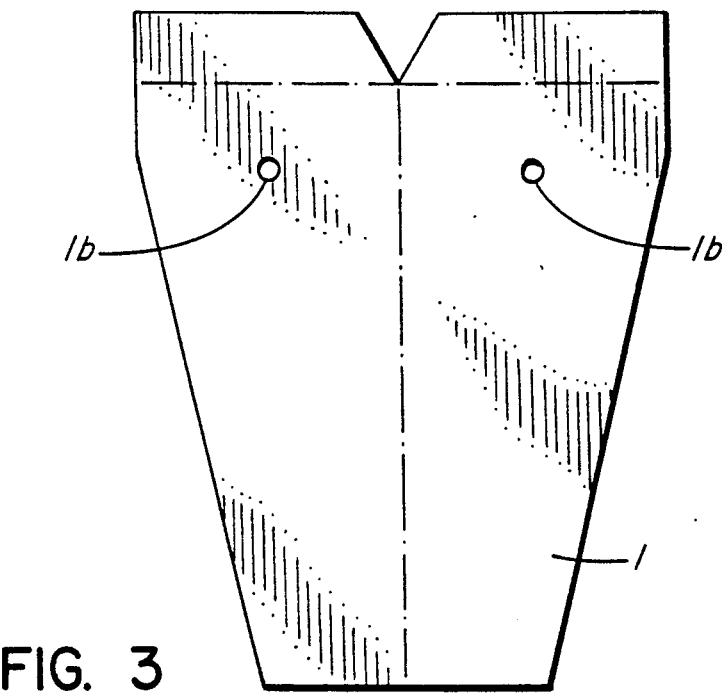
FIG. 3 is a plan view of a stove leg cut or die-stamped from thin sheet metal and prior to its being bent into final form by folding along the bend axes shown as dashed lines.
Figure 4:
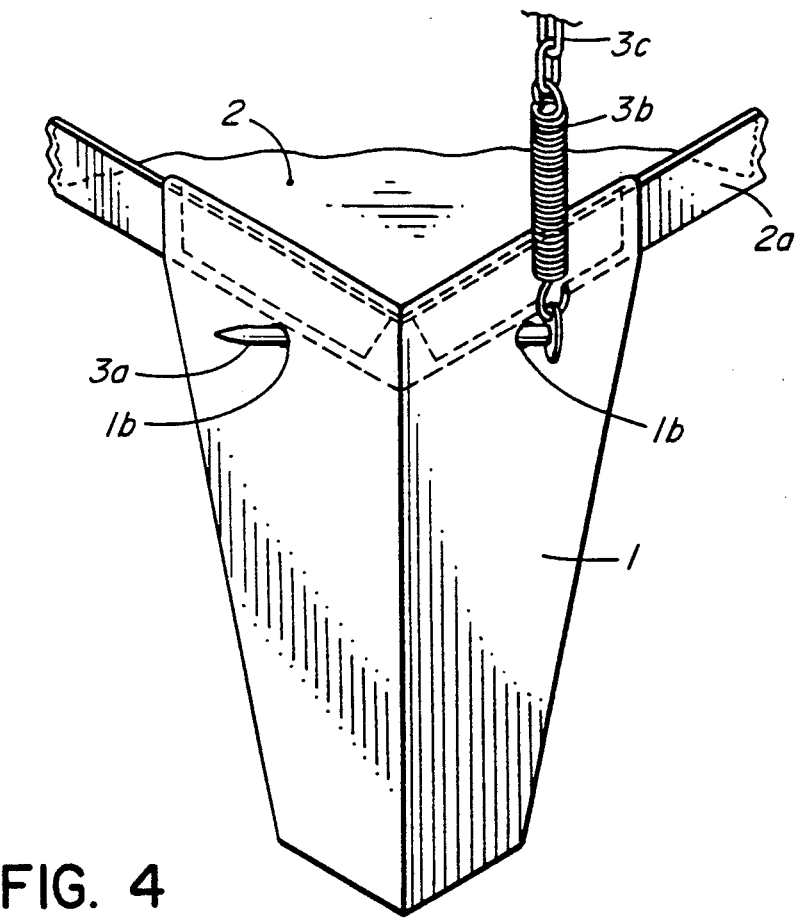
FIG. 4 is an isometric perspective view of a stove leg after it has been bent into its final form and secured in position at a corner of the stove base by means of a pin of a pin-spring-chain assembly.

The stove (FIGS. 1 and 2) consists of sixteen essential parts. These are four legs 1, stove base 2, four pin-spring-chain assemblies 3a-3b-3c, two stove sides 4, one stove front 5, one stove back 6, one stove top 7, and two stokehole covers 7e. All parts, except the pin-spring-chain assemblies, are fabricated from thin blued sheet metal approximately 0.38 millimeters thick, used in the manufacture of stovepipes for woodburning airtight heaters and campstoves. Each pin-spring-chain assembly comprises a metal pin 3a joined to a steel tension spring 3b joined to a small lightweight steel chain 3c having an open hook at its outer end of the assembly. The combustion chamber is formed by six plates. Four of these, namely one stove base 2, one stove top 7, and two stove sides 4, are rectangular in outline. The other two, namely one stove front 5 and one stove back 6, are square in outline. The vertically positioned plates 4, 5, and 6 are fitted together by means of interlocking flanges 4a, 5a, and 6a, these plates all resting on the stove base 2 within its peripheral edge flange 2a, and capped by the stove top 7, within its peripheral edge flange 7a. The combustion chamber is supported on four legs 1, each held in place at a corner of the stove base 2 by leg flanges 1a fitted over the peripheral edge flange 2a of the stove base 2, and by a pin 3a inserted through one of the leg holes 1b of each leg 1, under the corner of the stove base 2, and out through the other leg hole 1b. Hooks at the ends of the chains 3c of the pin-spring-chain assemblies, inserted through holes 7b in the peripheral edge flange 7a of the stove top 7, allow the four pin-spring-chain assemblies to exert tensional forces between the stove base 2 and stove top 7 and thereby maintain the structural integrity of the combustion chamber. These tensional forces also serve to jam each inserted pin 3a upward against each stove base corner and downward against each leg hole 1b where the pin exits. This jamming action is effected by the pin 3a acting as a lever arm where a force is applied upward at one end by the tension spring 3b, the stove base corner acts as a fulcrum, and the leg hole 1b through which the pin exits acts as the other opposing force.

The position of each spring 3b at the bottom of the chain 3c of each pin-spring-chain assembly allows the spring to escape any damage from over-heating during operation of the stove.

The stove front 5 contains an air intake 5b and air intake cover 5c held in place by a rivet 5d about which the air intake cover can be rotated to adjust the intake of air for combustion. Two stokeholes 7d in the stove top 7 provide access to the combustion chamber. Two stokehole covers 7e fit over the stokeholes. A stovepipe collar 7c at the rear of the stove top 7 allows addition of stovepipe for venting the products of combustion.

While spot welds can be used at the corners of the stove base and stove top to secure the corners of the peripheral edge flanges, the welds are not necessary and their absence in no way alters or impairs the full functioning of the stove.

The sequence of assembly is (FIGS. 1 and 2): The four legs 1 are set in place so that their upper flanges 1a fit over the peripheral edge flange 2a of the stove based 2 at its corners, and are secured in position by inserting pins 3a of the pin-spring-chain assemblies through holes 1b in the legs, from side to front end of the stove and from side to back end of the stove. The two stove sides 4 are connected to the stove front 5 and stove back 6 by sliding together their interlocking flanges 4a with 5a and 4a with 6a. The stove front 5 is positioned so that when vertical, the air intake vent 5b is near the bottom. The interlocked stove sides 4, stove front 5, and stove back 6 are squared so that they meet each other at right angles, and are placed upon the stove base 2, within its peripheral edge flange 2a. The stove top 7 is placed to cap the top edges of the interlocked stove sides 4, stove front 5, and stove back 6, so that the stovepipe collar 7c in the stove top 7 is closest to the stove back 6. The hooks at the ends of the chains 3c are placed through holes 7b in the peripheral edge flange 7a of the stove top 7. The stokehole covers 7e are placed over the stokeholes 7d. To make the assembled stove operational, standard three inch diameter stovepipe, of appropriate length and configuration suitable for venting the products of combustion, is connected to the stove at the stovepipe collar 7c.

Dismantling of the stove is achieved by following the precise opposite sequence of its assembly. Once dismantled, the parts can be stacked to form a compact unit. Stove sides fit flat against the stove base within its peripheral edge flange. The stove base is then capped by the stove top. The stove front and stove back fit together, enclose the two stokehole covers and the four pin-spring-chain assemblies between them, lie on the front part of the stove top, and are held in place by two elastic bands. The four legs stack together, lie on the stove top alongside the stovepipe collar, and are secured in place by one or two elastic bands.

The embodiments of the invention in which an exclusive property or privilege is claimed are defined as follows:

1. A lightweight collapsible free-standing woodburning stove that can be easily and quickly assembled or collapsed without the use of any tools whatsover is formed entirely, except for four pin-spring-chain assemblies which serve to preserve the structural integrity of the assembled stove, of simple planar parts cut or die-stamped from lightweight thin sheet metal, six of the said simple parts, namely a stove base, two stove sides, a stove front, a stove back, and a stove top, forming a fully functional box-shaped combustion chamber by means of loose fitting narrow interlocking flanges, said flanges formed by bending the vertically positioned edges of the stove sides, stove front, and stove back so that the vertically positioned edges of the stove sides interlock with the vertically positioned edges of the stove front and stove back, the interlocked stove sides, stove front, and stove back all then resting on the stove base within upward projecting flanges of the stove base, and capped by the stove top within downward projecting flanges of the stove top, said flanges of both the stove base and stove top formed by bending narrow margins of the peripheral edges of the stove base and stove top 90 degrees to the planar surfaces of the stove base and stove top, said combustion chamber thus formed as above then maintained in its structural integrity together with four supporting legs by means of four pin-spring-chain assemblies, the pin of each pin-spring-chain assembly holding each leg in place on the stove bottom, the spring of each pin-spring-chain assembly extended in tension between each pin and each chain connected to the stove top at positions near the stove top corners, so that the stove base and stove top are held securely against the bottom and top edges respectively of the stove sides, stove front, and stove back.

2. The legs for a stove as defined in claim 1, each leg formed by cutting or die-stamping lightweight thin sheet metal to a planar form in which two separate adjacent top flanges are formed by bending a narrow margin at the top edge of the form 180 degrees, then bending the said planar form along a central vertical axis so that each half of the bent planar form meets the other half at 90 degrees along the bend axis, forming a very lightweight and structurally competent stove leg, said stove leg having two holes either punched or drilled on each side of the bend axis at points just below the edges of the flanges so that with the stove leg placed at the corner of the stove base of the stove defined in claim 1, with the flanges of the stove leg fitted over the peripheral upward projecting flanges of the said stove base at the stove base corner, a pin is inserted through one of the holes in the stove leg, under the edge of the stove base in contact or near contact with the stove base, and out through the other hole, thus locking the stove leg to the stove base, the said pin not only locking the stove leg to the stove base, but being prevented from movement, in the axial direction, from its fully inserted position, by being jammed, in opposite directions normal to its axis, upward against the bottom of the stove base corner and downward against the leg hole through which it exits, this jamming action being effected by the pin acting as a lever arm where a force is applied upward at one end by the tension spring, the stove base corner acts as a fulcrum, and the leg hole through which the pin exits acts as the other opposing force.

* * * * *